United States Patent
Barrett

[11] Patent Number: 5,917,977
[45] Date of Patent: Jun. 29, 1999

[54] COMPOSITE CABLE

[75] Inventor: Louis A. Barrett, Conover, N.C.

[73] Assignee: Siecor Corporation, Hickory, N.C.

[21] Appl. No.: 08/931,634

[22] Filed: Sep. 16, 1997

[51] Int. Cl.$^6$ ................................. G02B 6/44
[52] U.S. Cl. ................ 385/101; 385/103; 385/113; 385/100
[58] Field of Search ................. 385/100–114, 101

[56] References Cited

U.S. PATENT DOCUMENTS

| | | | |
|---|---|---|---|
| 5,268,971 | 12/1993 | Nilsson et al. | 385/101 |
| 5,373,100 | 12/1994 | Arroyo et al. | 174/23 |
| 5,418,878 | 5/1995 | Sass | 385/101 |
| 5,469,523 | 11/1995 | Blew et al. | 385/101 |
| 5,481,635 | 1/1996 | Arroyo et al. | 385/103 |
| 5,539,851 | 7/1996 | Taylor et al. | 385/101 |
| 5,544,270 | 8/1996 | Clark | 385/101 |
| 5,557,698 | 9/1996 | Gareis | 385/101 |
| 5,621,841 | 4/1997 | Field | 385/113 |
| 5,740,295 | 4/1998 | Kinard et al. | 385/109 |

*Primary Examiner*—Phan T. H. Palmer
*Attorney, Agent, or Firm*—Timothy J. Aberle

[57] ABSTRACT

A composite cable (10) includes a core section (12), a tensile strength section (20), a conductor and water blocking section (30), an armor tape (50), and an outer jacket (60). Core section (12) includes at least one fiber optic conductor (14), and conductor and water blocking section (30) includes twisted pair conductors (32) and water blocking members (36,37). Tensile strength section (20) includes strength members (22). Composite cable (10) combines the high bit-rate capacity of fiber optic conductor (14) with the electrical signal/power carrying capacity of electrical conductors (32) and meets water blocking and tensile strength requirements.

29 Claims, 2 Drawing Sheets

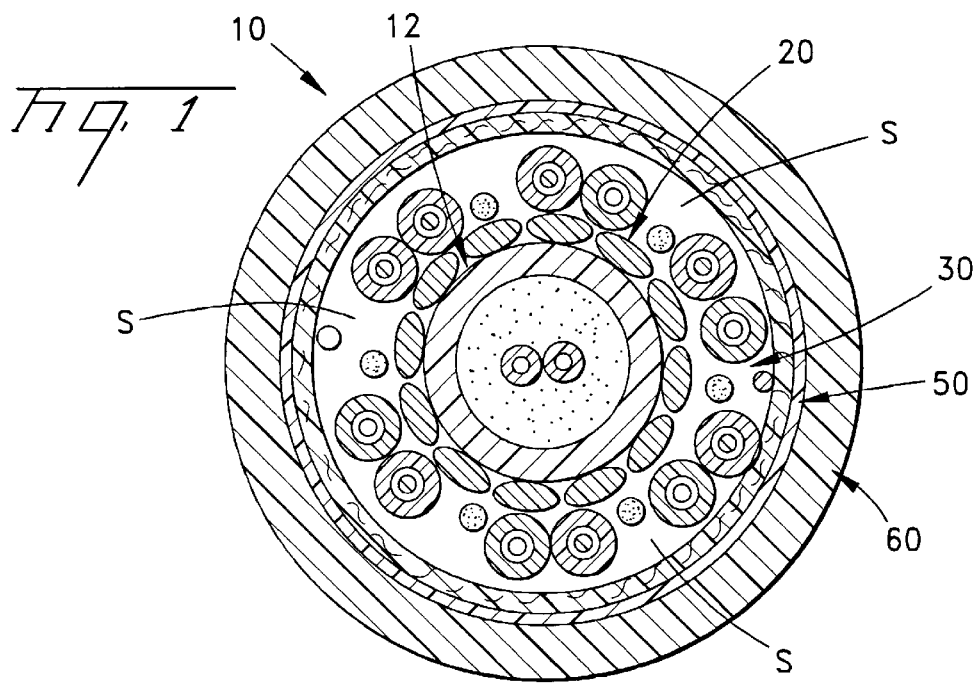
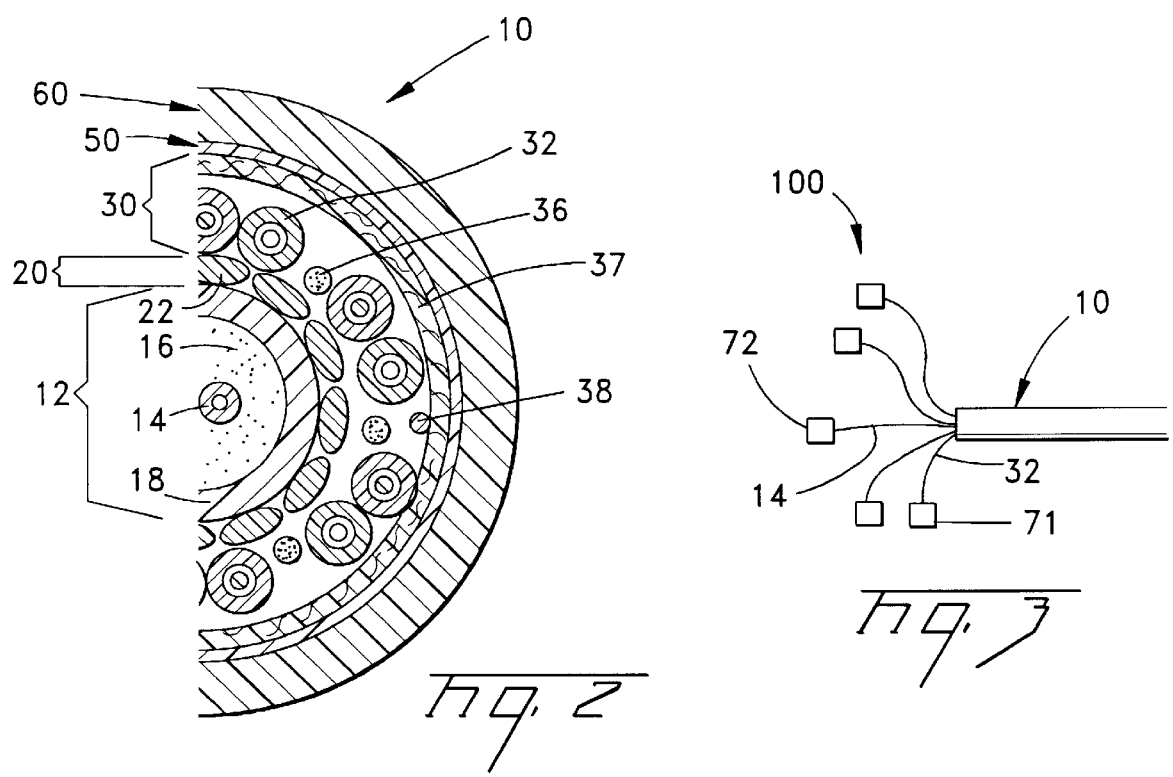

COMPOSITE CABLE

The present invention relates to a composite cable which combines the high bit-rate capacity of optical fiber conductors with the electrical signal/power carrying capacity of electrical conductors.

BACKGROUND OF THE INVENTION

A known composite cable is disclosed in U.S. Pat. No. 5,544,270 wherein a cable is described having multiple twisted pairs of electrical conductors in combination with optical fiber conductors. The known cable has interstices between the twisted pair conductors and optical fiber conductors, none of which interstices include water blocking features. Water blocking is important because it prevents the cable from becoming a conduit for the flow of water. Moreover, the optical fiber conductors are not protected by strength members.

A second known composite cable is disclosed in U.S. Pat. No. 5,539,851, which cable includes a single central, tight buffered optical fiber surrounded by a ring of electrical conductors and a braided sheath RFI shield. The optical fiber is immediately surrounded by a KEVLAR sleeve and a TEFLON jacket. Because the composite cable has a single fiber, it has limited information carrying capacity. Additionally, the composite cable does not provide water blocking features in the interstices adjacent the electrical conductors. Moreover, the combination of a KEVLAR sleeve, TEFLON jacket, a ring of electrical conductors, and a braided sheath results in a large, stiff composite cable which is not particularly suited to being routed through cable enclosures.

A third known composite cable is disclosed in U.S. Pat. No. 5,481,635, which cable includes a single large, central broadband coaxial cable, a set of voice-line twisted pair conductors, and a set of power conductors disposed around the coaxial conductor. Water blocking members are disposed about the coaxial cable. Compared to a fiber optic core, however, a coaxial core is disadvantageous because it has a smaller bandwidth, and is subject to higher power loss. Moreover, the coaxial conductor is subject to electormagnetic interference, impedance, and electrical cross talk. Further, the coaxial conductor core is generally relatively heavier and larger making it harder to install than an optical fiber core. Additionally, the coaxial conductor presents a spark hazard. Finally, because the coaxial conductor emits electromagnetic energy, it is easier to tap and is therefore less secure than an optical fiber core.

OBJECTS OF THE INVENTION

It is an object of the present invention to provide a low-cost composite cable which combines the high bit-rate capacity of optical conductors with the electrical signal/power carrying capacity of electrical conductors, and which cable meets water blocking and strength requirements.

It is another object of the present invention to provide a low-cost data transmission cable which has a core section with an optical fiber conductor, and a conductor and water blocking section having conductors and interstices adjacent the conductors, at least one of the conductors being generally disposed adjacent strength members and between water blocking members.

It is a further object of the present invention to provide a composite cable with a fiber optic core section protected by strength members, and an annulus defined between the core section and a jacket of the cable, the annulus comprises a set of conductors with interstices between at least some of the conductors, the annulus further comprises distinct water blocking members, at least one of the water blocking members being disposed in one of the interstices, and another water blocking member being adjacent the conductors.

It is yet another object of the present invention to provide a composite cable having a fiber optic core section which advantageously imparts a high information carrying capacity to the composite cable without being subject to electromagnetic interference, is generally of a small size and has a light weight, is secure because it emits almost no electromagnetic energy, and does not present a spark hazard.

SUMMARY AND ADVANTAGES OF THE INVENTION

In achieving the foregoing objects, embodiments of the present invention comprise a composite cable with a fiber optic core section, the core section including at least one fiber optic conductor. The composite cable also includes a strength section, the strength section having strength members generally surrounding the core section for imparting strength and anti-buckling to the composite cable. Advantageously, the composite cable includes a conductor and water blocking section having a set of conductors, interstices being adjacent the conductors, a water blocking member in at least some of the interstices, and a separate water blocking member adjacent to the set of conductors.

In a preferred embodiment, an annulus defined between a jacket and the core section comprises several water blocking members. The set of conductors is disposed in the annulus, and interstices exist adjacent to the conductors. The interstices may be particularly susceptible to the conduction of water if water were to enter the cable. To prevent the conduction of water, several water blocking members are advantageously provided in the annulus. A first water blocking member, preferably comprising a water blocking yarn, is disposed in the interstices. The first water blocking member is preferably stranded with the conductors, which ensures that the interstices will have sufficient water blocking protection.

A second water blocking member, for example, a water blocking tape, is disposed in the annulus and surrounds the conductors. The water blocking tape is longitudinally wrapped, preferably without lay, about the conductor and water blocking section whereby respective conductors are generally disposed between the first and second water blocking members. A third water blocking member disposed in the annulus may be strength members impregnated or coated with a water blocking material. The annulus may, therefore, comprise at least three water blocking features for the prevention of water conduction therein, namely, a water blocking tape, water blocking yarns, and strength members impregnated or coated with a water blocking material. In view of the foregoing, the composite cable advantageously meets water blocking and strength requirements.

Moreover, the composite cable of the present invention has a fiber optic core section which imparts a high information carrying capacity to the cable without being subject to electromagnetic interference. The composite cable of the present invention is generally of a small size and has a light weight making the cable easy to route during installation. Furthermore, the composite cable of the present invention is secure because the fiber optic core emits almost no electromagnetic energy, and the fiber optic core does not present a spark hazard. With reference to the following disclosure, further advantages and embodiments of the present invention may become apparent.

BRIEF DESCRIPTION OF THE DRAWING FIGURES

FIG. 1 shows a cross sectional view of a composite cable according to an embodiment of the present invention.

FIG. 2 is a partial cross section of the composite cable of FIG. 1.

FIG. 3 is a side view of the composite cable of the present invention as part of a cable assembly including electrical connectors and a fiber optic connector.

DETAILED DESCRIPTION OF THE INVENTION

Figure 4:
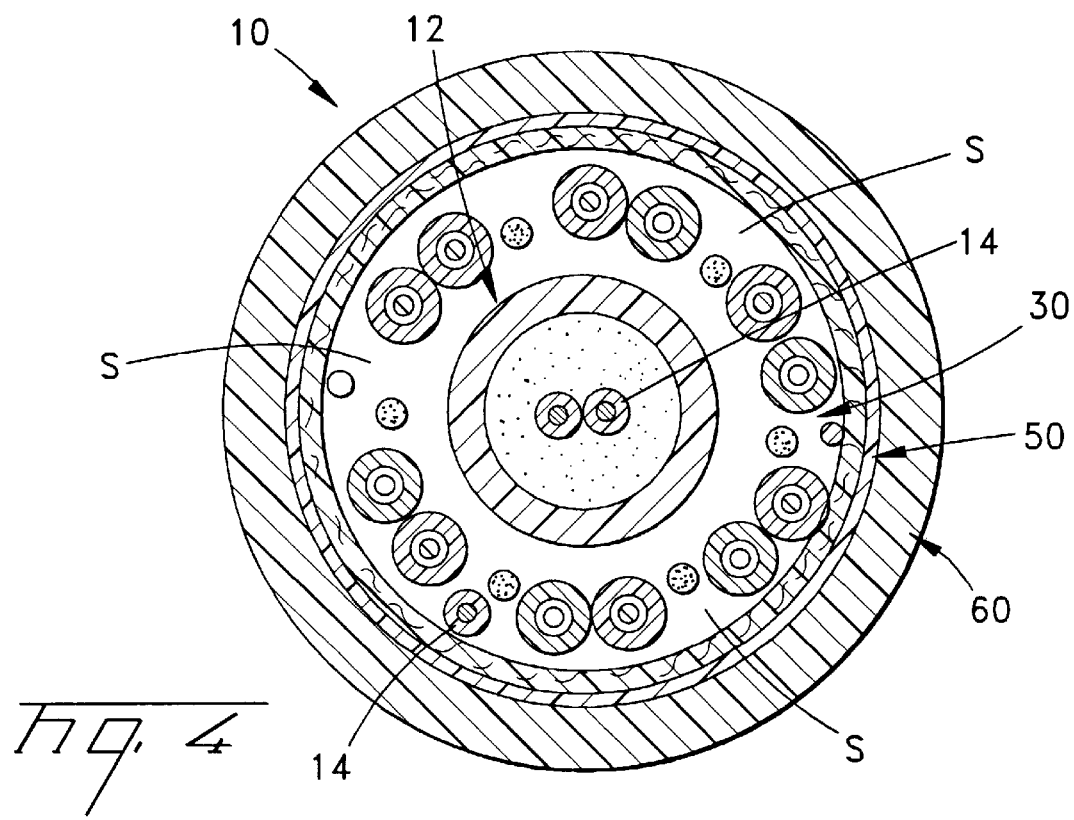
FIG. 4 is a cross section of a fiber optic cable according to the present invention.

Referring to FIGS. 1–2, a composite cable 10 according to the present invention will be described. Composite cable 10 includes a core section 12, a strength section 20, a conductor and water blocking section 30, an armor tape 50, and an outer jacket 60. Composite cable 10 is capable of both optical and electrical/electronic signal transmission.

Fiber optic core section 12 includes a fiber optic conductor 14 disposed in a water blocking material 16 inside a buffer tube 18. Fiber optic conductor 14 may comprise a plurality of individual optical fibers. Alternatively, fiber optic conductor 14 may be a single optical fiber, or a group of optical fibers, for example, in a bundle, or one or more optical fiber ribbons. Fiber optic core section 12 advantageously imparts a high information carrying capacity to fiber optic cable 10 without being subject to electromagnetic interference. Core section 12 is generally of a small size and has a light weight which facilitates installation of fiber optic cable 10. Additionally, core section 12 is secure because it emits almost no electromagnetic energy. Moreover, core section 12 does not present a spark hazard.

Material 16 is a thixotropic water blocking material which permits movement of fiber optic conductor 14 during bending, expansion, or contraction of cable 10. Material 16 is, for example, a silicone or a petroleum-based material. Alternatively, buffer tube 18 may comprise a dry water blocking material, for example, a hydrophilic powder dispersed or impregnated in tube 18, or material 16 may comprise water blocking tape or yarn. Buffer tube 18 is preferably formed of a plastic material, e.g. a polypropylene material, but a buffer tube with one or more layers of polyester material may be used as well. Additionally, although buffer tube 18 comprises a loose tube type design, a tight buffered design (FIG. 5) such as is disclosed in U.S. Pat. No. 5,627,932, which patent is hereby incorporated by reference in its entirety, may be advantageously used as well, particularly for indoor applications of cable 10.

Strength section 20 includes, for example, commercially available impregnated fiberglass members 22 with a helical lay about buffer tube 18. Alternatively, strength members 22 may comprise a KEVLAR material. Preferably, strength members 22 impart anti-buckling, compressive and tensile strength features to cable 10. Additionally, strength members 22 may be impregnated or coated with a water blocking compound. Tensile strength section 20 advantageously provides strength to composite cable 10 thereby reducing or avoiding stress on buffer tube 18 and fiber optic conductor 14.

Figure 5:
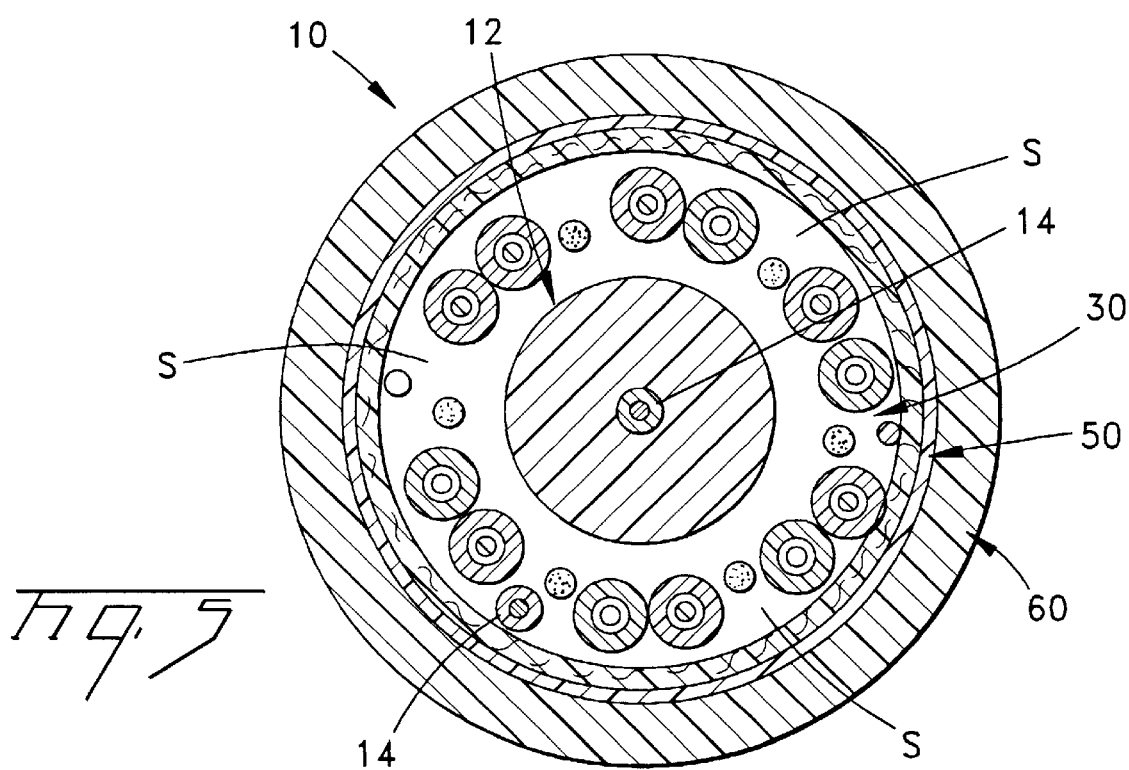
FIG. 5 is a cross section of a fiber optic cable according to the present invention.

Conductor and water blocking section 30 includes a set of conductors, for example, twisted pair conductors 32 for electrical power, control, and/or data transmission. Conductors 32 are preferably stranded about strength members 22 with an SZ or a counter-helical lay with respect to strength members 22. Conductors 32 preferably range between AWG sizes 19 to 22, and provide cable bending and buffer tube protection. An SZ or counter-helical lay of conductors 32 provides torsion balancing. Set of conductors 32 may include one or more fiber optic conductors 14 (FIGS. 4–5).

The position of conductors 32 between armor tape 50 and core section 12 forms an annulus 40, which includes conductor and water blocking section 30 and interstices S adjacent to conductors 32. Interstices S may be particularly susceptible to conducting water if water were to enter the cable. To prevent the conduction of water, distinct water blocking members are advantageously provided in conductor and water blocking section 30. A first water blocking member, preferably comprising a water blocking yarn 36, is disposed in interstices S. Water blocking yarn 36 is preferably stranded with twisted pair conductors 32, which ensures that interstices S will have sufficient water blocking protection. Alternatively, water blocking yarn 36 may comprise a water blocking tape, or a thixotropic water blocking material, e.g. a silicone gel or a grease material.

A second water blocking member, for example, a water blocking tape 37 is disposed in annulus 40. Water blocking tape 37 is longitudinally wrapped, preferably without lay, about conductor and water blocking section 30 whereby respective twisted pair conductors 32 are generally disposed between respective water blocking yarn 36 and water blocking tape 37. Alternatively, tape 37 may be helically wrapped about twisted pair conductors 32. Armor ripcords 38 are provided for stripping jacket 60 and armor tape 50. A third water blocking member disposed in annulus 40 may be strength members 22 which, as set forth above, may be impregnated or coated with a water blocking compound. Annulus 40 may, therefore, comprise at least three water blocking members, namely, water blocking tape 37, water blocking yarns 36, and strength members 22 impregnated or coated with a water blocking compound.

Armor tape 50 comprises a metallic material, for example, a corrugated steel tape material, and provides electrical shielding and protection against rodents. Alternatively, a laminated aluminum, copper clad steel, or bronze tape may be used. Jacket 60 is formed of a robust material, for example, a medium density polyethylene material. Flame retardant additives may be added to jacket 60 in order to meet indoor-use testing requirements when cable 10 is adapted for indoor use.

FIG. 3 shows a cable assembly 100 incorporating composite cable 10. Assembly 100 includes conventional electrical connectors 71 respectively terminated with twisted pairs 32, and an SC type connector 72 terminating each optical fiber 14. The SC type connector is sold by the SIECOR Corporation of Hickory, N.C.

The present invention has thus been described with reference to the foregoing embodiments, which embodiments are intended to be illustrative of the inventive concept rather than limiting. Persons of skill in the art will appreciate that variations and modifications of the foregoing embodiments may be made without departing from the scope of the appended claims. For example, to enhance manufacturability and/or strength, a composite cable (not shown) can be made according to an embodiment of the present invention wherein strength members 22 are disposed radially within water blocking tape 37 but surrounding conductors 32, and a water blocking member is disposed about buffer tube 18.

In another embodiment of the present invention, a low-cost, easily manufacturable composite cable (FIG. 4) may be formed without strength members 22.

Accordingly, what is claimed is:

1. A composite cable, comprising:
    a fiber optic core section, said core section including at least one fiber optic conductor;
    a strength section, said strength section having strength members generally surrounding said core section for imparting strength and anti-buckling to said composite cable;
    a conductor and water blocking section having a set of conductors, interstices being adjacent said conductors, a water blocking member in at least some of said interstices, and a separate water blocking member adjacent to said set of conductors.

2. The composite cable of claim 1, wherein at least two of said set of conductors are electrical conductors.

3. The composite cable of claim 2, wherein said electrical conductors comprise a twisted pair of conductors.

4. The composite cable of claim 1, wherein said core section comprises a buffer tube.

5. The composite cable of claim 4, wherein said strength section comprises fibrous members which generally surround said buffer tube.

6. The composite cable of claim 1, wherein said conductor and water blocking section surrounds said strength section.

7. The composite cable of claim 1, wherein said core section comprises a tight buffered fiber optic cable for indoor use.

8. A composite cable, comprising:
    a fiber optic core section, said core section including at least one fiber optic conductor;
    a strength section, said strength section generally surrounding said core section for imparting tensile strength to said composite cable;
    a conductor and water blocking section, said conductor and water blocking section having a set of conductors and interstices adjacent said conductors, at least one of said conductors being generally disposed between first and second water blocking members.

9. The composite cable of claim 8, wherein one of said water blocking members is stranded between said at least one conductor of said set of conductors and another conductor of said set of conductors.

10. The composite cable of claim 9, wherein said set of conductors comprises a helical or SZ lay about said strength section.

11. The composite cable of claim 10, wherein said strength section lay is generally opposite to said lay of said conductors.

12. The composite cable of claim 11, wherein said water blocking member comprises a helical or SZ lay.

13. The composite cable of claim 8, wherein said set of conductors is arranged between said strength section and said one of said water blocking members.

14. The composite cable of claim 8, wherein said strength section comprises a helical or SZ lay about said core section.

15. A composite cable, comprising:
    a fiber optic core section, said fiber optic core section including at least one fiber optic conductor, fiber optic core section being protected by a strength section;
    a jacket, said jacket surrounds said core section;
    an annulus defined between said jacket and said core section, said annulus comprises a set of conductors with interstices between at least some of the conductors;
    said annulus further comprises first and second water blocking members, said first water blocking member being disposed in one of said interstices, said second water blocking member being adjacent said set of conductors.

16. The composite cable of claim 15, wherein said annulus comprises a third water blocking member, said third water blocking member being adjacent said fiber optic core section.

17. A composite cable, comprising:
    an optical core section, said optical core section including at least one optical conductor;
    a jacket, said jacket surrounds said core section; and
    an annulus, said annulus being defined between said jacket and said core section, said annulus comprising a set of conductors with interstices between at least some of the conductors;
    a water blocking member, said water blocking member being disposed in one of said interstices adjacent said set of conductors.

18. The composite cable of claim 17, said optical core section comprising a tube surrounding said optical conductor.

19. The composite cable of claim 18, said tube comprising a water blocking substance.

20. The composite cable of claim 19, said water blocking substance comprising a dry water blocking substance.

21. The composite cable of claim 19, said water blocking substance comprising a silicone or petroleum based material.

22. The composite cable of claim 17, said composite cable comprising a second water blocking member, said second water blocking member surrounding said optical core section.

23. The composite cable of claim 22, said second water blocking member comprising a water blocking tape adjacent said jacket.

24. The composite cable of claim 17, some of said conductors comprising electrical conductors.

25. The composite cable of claim 24, some of said electrical conductors comprising a twisted pair.

26. The composite cable of claim 17, said composite cable comprising an armor tape.

27. The composite cable of claim 17, said water blocking member comprising a water blocking yarn.

28. The composite cable of claim 17, said optical core section comprising a tight buffered optical fiber.

29. The composite cable of claim 17, said annulus comprising an optical conductor.

* * * * *